United States Patent [19]
Bovington

[11] Patent Number: 5,635,064
[45] Date of Patent: Jun. 3, 1997

[54] WASTE WATER FILTER

[76] Inventor: Thomas P. Bovington, P.O. Box 670, Helena, Mont. 59624

[21] Appl. No.: 497,109

[22] Filed: Jun. 30, 1995

[51] Int. Cl.$^6$ .............................. B01D 29/58; C02F 3/28
[52] U.S. Cl. ........................................ 210/338; 210/532.2
[58] Field of Search ................................... 210/532.2, 320, 210/416.1, 336, 488, 489, 337, 338

[56] References Cited

U.S. PATENT DOCUMENTS

| | | | |
|---|---|---|---|
| 2,900,084 | 8/1959 | Zabel | 210/460 |
| 3,332,552 | 7/1967 | Zabel | 210/86 |
| 4,319,998 | 3/1982 | Anderson | 210/86 |
| 4,439,323 | 3/1984 | Ball | 210/608 |
| 4,710,295 | 12/1987 | Zabel | 210/336 |
| 5,198,113 | 3/1993 | Daniels | 210/608 |

*Primary Examiner*—Thomas G. Wyse
*Attorney, Agent, or Firm*—Jerry Johnson

[57] ABSTRACT

A waste water filter comprises a filter for use within a septic tank. The waste water filter includes a shield including at least one inlet location for allowing the entry of unfiltered waste water into the shield. The shield further includes at least a first and second interior location. The waste water filter further comprises a filter element disposed within the shield, the filter element including at least first and second filter surfaces including filtering means that allow the passage of water while restricting the passage of solids. The first interior location of the shield is in direct fluid communication with the first filter surface of the filter element and the second interior location is in direct fluid communication with the second filter surface of the filter element. Unfiltered waste water entering the first interior location can only access the second filter surface after having passed through the first filter surface, and unfiltered waste water entering the second interior location can only access the first filter surface after having first passed through the second filter surface. The waste water filter further includes an outlet in fluid communication with the filter element for discharging filtered waste water.

19 Claims, 1 Drawing Sheet

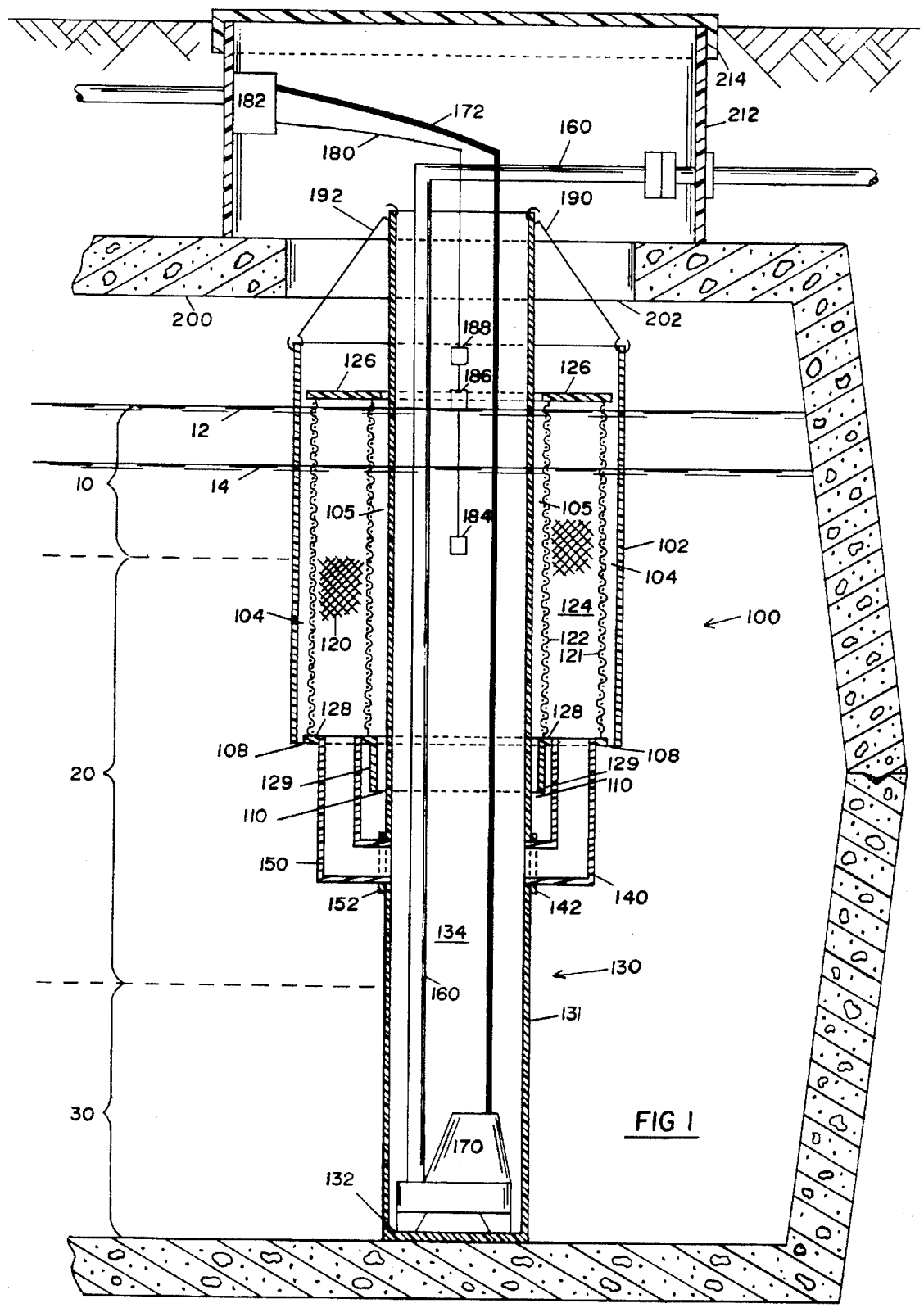

WASTE WATER FILTER

BACKGROUND

In rural areas septic tanks in conjunction with drain fields are utilized to handle and treat residential wastewater. Septic tanks typically comprise a concrete or plastic container that receives incoming waste water or influent from the sewage drains of the residence it serves. The septic tank incorporates biologically active agents to aerobically and anaerobically digest the waste constituents of the influent that enters the tank. The digestion process causes waste particles or solids once digested to precipitate to the floor of the septic tank and form a sediment referred to as sludge. On the surface of the waste water within the tank a layer of scum forms that includes a high grease content which is unable to be dissolved into the waste water. Biological agents in the scum layer digest the waste particles in this layer which causes these particles to precipitate to the sludge layer at the bottom of the tank. A so called clear zone separates the scum layer and the sludge layer in the tank. The so called clear zone is relatively clear of suspended solid waste particles but includes particles precipitating to the bottom of the tank as the density of the particles undergoes changes during digestion. Sludge gasification further causes bubbles to form in the sludge layer which when rising to the surface also carry particles with them.

Traditionally, relatively clear waste water is discharged as effluent from the clear zone of the tank into piping that carries the effluent to a drain field or leach field. The drain field typically comprises a highly porous bed of gravel, sand or other coarse and fine aggregates. The drain field is usually disposed underground below the level of the septic tank but at a depth above the groundwater level. The drain field is efficient in allowing the wastewater to leach or percolate into the ground and eventually into the groundwater. Water leaching through the porous drain field is further filtered of solids by the gravel and sand of the drain field. Additionally, aerobic and anaerobic digestion of solids occurs in the drain field. By the time the wastewater has reached the groundwater supply it has been treated by the digestion process within the septic tank and from the filtering effect of the drain field.

The quality of wastewater that is permitted to enter the groundwater supply is stringently regulated in some areas to minimize the negative environmental effects that are associated with poorly treated wastewater entering the groundwater supply. These regulations have necessitated improvements to the traditional septic tank and drain field residential waste water handling system. Furthermore, as solid waste particles are discharged unintentionally from the septic tank to the drain field, the porous structure of the drain field has a tendency to become clogged with these solids thus diminishing the drainage capabilities of the drain field. Improvements have been incorporated into the traditional septic tank and drain field design to minimize the amount of solids that are discharged into a drain field to thus insure a maximum drainage efficiency.

The two goals of maximum drain field drainage efficiency and minimum environmental impact have been best achieved in the past by the incorporation of a filter device placed in the septic tank to filter effluent leaving the tank. This filter, once utilized, insures that a minimum of untreated solid waste particles are discharged from the tank into the drain field. Additionally, maximum drain field drainage efficiency has been further advanced by the use of an incremental discharge apparatus such as a dosing siphon or pump to discharge the effluent from the tank to the drain fields. The use of an incremental discharge apparatus further necessitated the use of a filter to minimize the clogging effects of solids on the devices. Incremental discharge apparatus provide the benefit of discharging a large volume of water from the tank at spaced time increments. This type of discharge has a cleansing effect on solids accumulating within piping and within the drain field, as well.

These previous attempts at filtering the effluent that is discharged from a septic tank into a drain field have been successful in limiting the amount of untreated solid waste particles exiting the septic tank. Nevertheless, previous effluent filters had inherent inefficiencies due to their construction. Previous effluent filters are typically of a first design that utilizes a single filtering surface that is mounted in a housing, or of a second design that utilizes a filter comprising multiple stacked filtering elements within a housing. The first filter design which incorporates a single filter surface typically further incorporates a pump or other discharge apparatus that is maintained within the interior of the filter to permit the incremental discharge of filtered waste water to the drain field.

A first deficiency of both previous types of effluent filters is the clogging effect of suspended particles caused by the flow patterns within the filter and housing. In either system, waste water that enters the housing passes through the single filter surface or through one of the multiple stacked filter elements in essentially unidirectional flow. This unidirectional flow causes solid waste particles to accumulate on the filter surface or within the filter elements so as to progressively minimize the efficiency of the filter until it is completely clogged.

A second deficiency in the two previous filter designs is the lack of self cleaning properties. Solid waste particles that enter the housing are subject to digestion but are unlikely to be removed from the housing due to the unidirectional flow patterns within the housing.

A third deficiency of the two previous filter designs is a result of the manner that waste water is supplied to the filter. In either design there is essentially a single route or flow pattern for waste water to proceed into the housing and through the filter. In the past filter designs utilizing a single filter surface, waste water is able to enter the housing at various openings all of which advance the waste water to the same location within the housing and provide the waste water with a single surface such as a screen through which the waste water must pass to be discharged from the tank by a suitable means. Similarly, in the past filter designs utilizing multiple stacked filter elements, waste water enters the housing only at a single location and is then able to proceed through the filter. If the filter surface or filter elements of either system clog, no alternative flow pattern is possible to pass water through the filter. Furthermore, if the single location opening of the housing become clogged by the eventual upward advancement of the sludge layer or by the eventual downward movement of the scum layer the housing will not provide an alternative flow pattern for the waste water to access the filter.

A fourth deficiency in the first and second previous effluent designs has been the inability to back flush the filter. This feature is a necessity considering the inherent tendency of the previous filter designs to clog with solid particles quite easily.

In lieu of the deficiencies of previous effluent filter designs there is clearly a need for a filter that: minimizes the clogging effects of accumulating solid waste particles on the filter surface by providing an alternative to unidirectional flow through the filter; provides self cleaning to the filter so as to minimize costly maintenance; provides alternative flow patterns through the filter to maximize efficiency and to provide the filter the capability to function if a single flow pattern is not functioning; and can be easily back flushed.

SUMMARY

The present invention is drawn to a waste water filter that satisfies the aforementioned needs. The waste water filter of the present invention comprises a filter for use within a septic tank. The waste water filter includes a shield including at least one inlet location for allowing the entry of unfiltered waste water into the shield. The shield further includes at least a first and second interior location. The waste water filter further comprises a filter element disposed within the shield, the filter element including at least first and second filter surfaces including filtering means that allow the passage of water while restricting the passage of solids. The first interior location of the shield is in direct fluid communication with the first filter surface of the filter element and the second interior location is in direct fluid communication with the second filter surface of the filter element. Unfiltered waste water entering the first interior location can only access the second filter surface after having passed through the filtering means of the first filter surface, and unfiltered waste water entering the second interior location can only access the first filter surface after having first passed through the filtering means of the second filter surface. The waste water filter further includes an outlet in fluid communication with the filter element for discharging filtered waste water.

In greater detail, the first filter surface of the filter element comprises a peripheral wall and the second filter surface comprises a second peripheral wall disposed within the first peripheral wall spaced at a distance therefrom, the filter element further includes means to attach the first and second peripheral walls to thus enclose a region between the peripheral walls. The filter element is typically removable from the shield. The waste water filter may include a reservoir in fluid communication with the filter element and the outlet, the reservoir being downstream of the filter element and upstream of the outlet and may also include means to transfer water from the filter to the reservoir. The means to transfer water from the filter to the reservoir is in detachable engagement to the filter. The inlet locations may be disposed at two different vertical positions. The waste water filter may also include a discharging means, such as a pump that is in fluid communication with the reservoir and the outlet.

The present invention provides benefits that have heretofore been unrealized by previous waste water filter designs. The present invention addresses the need for a waste water filter that minimizes the clogging effect of accumulating solid waste particles on the filter. This is achieved by providing an alternative to the unidirectional flow patterns of waste water through the filter as has been previously utilized in waste waster filters. The present invention allows waste water to enter the interior of the filter from a location that is outside a first filter surface and from a location that is outside a second filter surface. The flow pattern created by this arrangement causes a somewhat turbulent flow to exist within both the filter and the locations outside the filter within the shield. The turbulence will have the effect of minimizing the accumulation of solid waste particles on the filter surfaces. This is because particles on the filter surface may be impacted by water from within the interior of the filter which will dislodge the particle from the filter surface. This will occur due to the turbulent flow of the water as it passes through the filter to the outlet. The obvious benefit of this feature is that the filter utilized in the present invention will remain at a high efficiency due to the minimizing of accumulated solids on the filter surface.

The present invention further addresses the need for a waste water filter to be self cleaning. The waste water filter of the present invention utilizes a shield and filter arrangement wherein the shield is typically constructed with essentially an open bottom. As particles are dislodged from the filter surfaces by the somewhat turbulent flow within the filter the particles are permitted to precipitate out of the first and second interior locations and out the bottomless shield, as well. These particles will then precipitate to the sludge layer at the bottom of the tank. Similarly, solid waste particles that have entered the first and second interior locations and have been digested by biologically active agents in these same locations will also be permitted to exit the shield and precipitate to the sludge layer. The obvious benefits of a self cleaning filter are decreased maintenance costs necessary to clean out or replace a clogged filter.

The present invention further addresses the need for alternative flow patterns through the filter. The filter typically utilizes two filter surfaces each in fluid communication with a separate interior location within the shield. Both interior locations of the shield contain unfiltered waste water but are in direct fluid communication with each other. This arrangement essentially provides the filter with two flow through patterns within the filter and shield. The first flow pattern being waste water entering into the shield and passing into the first interior location and subsequently through the first filter surface into the interior of the filter. The second flow pattern being waste water entering into the shield and passing into the second interior location and subsequently through the second filter surface into the interior of the filter. This filter arrangement will be unlikely to clog due to the two flow through patterns as both flow through patterns would have to become blocked to restrict the operation of the filter. This alternative flow pattern arrangement also provides the benefit of decreased cleaning maintenance. This arrangement may also include the added benefit of having waste water enter the shield at two different vertical locations. Should one location become blocked by scum or sludge the other entry location will still permit the filtering of waste water.

The present invention still further provides the benefit heretofore unrealized by previous waste water filter designs of being easily back flushed. Clean water that is forced into the reservoir will advance through to the filter interior and out the filter through the filter surfaces and progress out the shield. This back flush flow will remove a substantial portion of the accumulated solids from the filter surfaces and from the first and second interior locations within the shield. Essentially no disassembly of the system would be required by this operation and the open bottom of the shield would insure that dislodged particles would be permitted to be removed from the shield where they would precipitate to the sludge layer. This back flush procedure would be simple enough to be performed by an unskilled person. The benefit of this feature would be a further reduction in maintenance costs as no specialized labor would be required to perform the cleaning of the filter.

In addition to the previously described benefits the waste water filter of the present invention further provides the benefit of being very simple in construction and utilized materials and supplies already in the marketplace. The waste water filter of the present invention is extremely durable even though very few materials are necessary for its manufacture. As an example, the shield utilized does not require a top as no damage will occur if an overflow occurs into the interior of the shield. The waste water filter requires a minimum of materials to manufacture, is durable in construction, and is essentially maintenance free but allows simple maintenance to be performed by the user when necessary.

These and other advantages of the present invention will become apparent upon inspection of the accompanying specification, claims and drawing.

DRAWING

FIG. 1 is a cross-sectional side view of one version of the present invention.

DESCRIPTION

FIG. 1 illustrates in cross-section a version of the waste water effluent filter 100 of the present invention. As shown in this figure, the invention includes a shield 102, a filter element 120, a reservoir 130 which includes interior space 134 which also servers as a pump vault, water transfer tubes 140, discharge and outlet tube 160, pump 170, and switching means 180. The waste water filter is shown disposed in a septic tank 200 that includes access hole 202, riser 212 and access cover plate 214.

In greater detail, shield 102 comprises a vertical peripheral wall that partially encloses a chamber. The shield 102 has an open top and an open bottom. The shield typically has a cylindrical vertical wall but could be produced in a variety of cross-sectional geometric shapes.

Disposed within the shield 102 is the filter element 120. The filter element includes a first filter surface 121 and a second filter surface 122 which is disposed within the first filter surface 121. The first filter surface and the second filter surface typically comprise a vertical wall of filter material such as polyethylene screen. The filter surfaces 121 and 122 are in a spaced arrangement defining an intervening chamber or filter interior 124. The two filter surfaces are attached to each other at opposing ends by the top filter plate 126 and the bottom filter plate 128. Typically the filter material of the first and second filter surfaces 121 and 122 are embedded into the top and bottom filter plates 126 and 128. The filter element 120, as shown in FIG. 1, has a first filter surface 121 comprising a vertical cylindrical peripheral wall and the second filter surface 122 comprises a concentric vertical cylindrical peripheral wall disposed within the vertical cylindrical wall of the first filter surface 121. Like the shield 102 the filter element 120 could also utilize cross-sectional shapes other than that illustrated in FIG. 1.

Further shown in FIG. I is reservoir 130 comprising a vertical wall 131 and a base 132 inclosing an interior 134 that additionally served as a pump vault. The reservoir vertical wall is typically cylindrical although other shapes could be utilized. The reservoir 130 in FIG. 1 is shown free standing and extending through the total vertical height of the septic tank 200. An alternative to this arrangement would be a reservoir that is suspended from the septic tank 200. As shown in FIG. 1, the freestanding reservoir extends from the floor of the septic tank through the sludge layer 30, through the clear zone 20, through the scum layer 10 and finally to an area adjacent the ceiling of the septic tank 200.The reservoir 130 is disposed in the septic tank 200 through access hole 202. The reservoir 130 typically includes means from which to hang or suspend the shield 102 such as attachment wires 190 and 192. An alternative to this arrangement would be suspending the shield 102 from the septic tank 200. The shield is suspended into the tank into a position where the open bottom of the shield is within the clear zone and preferable vertically midway into the clear zone 20. The shield 102 is further sized and positioned to extend above the highest water level expected in the septic tank 200.

The reservoir further includes means to transfer water from the filter element 120 to the reservoir 130 which typically comprise water transfer tubes 140 and 150. Water transfer tubes 140 and 150 are attached to the reservoir 130 by fittings 142 and 152. The water transfer tubes in the version of the invention shown in FIG. 1 further serve the purpose of supporting the filter element 120 within the shield 102 typically in a detachable arrangement. As shown in FIG. 1 the waste water filter includes two water transfer tubes 140 and 150, however it is understood that more water transfer tubes could be utilized. It is further understood that the water transfer tubes may be of a variety of shapes and lengths and may also extend into the filter element interior 124 a significant amount.

The reservoir further serves as a pump vault permitting a pump 170 as well as a portion of the switching means 180 to be placed within the interior 134 or the reservoir. The type of pump utilized in the waste water filter 100 could be of a variety of types including a centrifugal type or vertical turbine type. It is also understood that a discharge device other than a pump such as a dosing siphon could be utilized by the invention. The pump 170 as shown in FIG. 1 utilizes an outlet tube 160 for discharging filtered effluent from the septic tank typically to a drain field (not shown). Pump switching means 180 comprises a high level alarm 188 for identifying the inoperation of the pump 170 or other condition leading to an abnormally high volume of waste water in the septic tank. Switching means 180 additionally includes a low level alarm 184 that further serves as a redundant off switch insuring that a suitable amount of water exists in the reservoir 130 for the pump to be operated. Should the water level descend too low in the reservoir the redundant off switch will deactivate the pump. The switching means 180 further comprises an on-off switch 186 for controlling the ordinary operation of the discharge means or pump 170. The normal operation of the pump includes activation of the pump when the water reaches a level such as is indicated by water level 12 and deactivation of the pump when the water level is lowered to a level such as is indicated by water level 14. It is understood that the switching means 180 could utilize devices such as floats or sensors for the low level alarm and redundant off 184, as well as the on-off switch 186 and the high level alarm 188.

As is illustrated in FIG. 1 the interior portion of the shield is occupied both by the filter element 120 and by a portion of the reservoir 130. The positioning of the reservoir 130 and filter element 120 in relation to the shield 102 further defines the intervening spaces within the shield 102. In the space between the interior surface of the shield 102 and the first filter surface 121 is the first interior location 104. The first interior location 104 is in fluid communication with the first interior location inlet passage 108 which is defined by the outer edge of lower filter plate 128 and by the interior surface of the shield 102. A second interior location 105 is defined by the space between the outer surface of the vertical wall of the reservoir 130 and the second filter surface 122. The second interior location 105 is in fluid communication with the second interior location inlet passage 110 which is defined by the space between filter extension 129 and reservoir wall 131. Filter extension 129 is typically attached to lower filter plate 128 to lower the vertical height of the inlet passage 110 in relation to the vertical height of the first interior location inlet passage 108. This arrangement allows the filter to operate even though one of the passages may be blocked. Although first and second interior location inlet passages are each shown as a single peripheral opening, it is understood that the first and second inlet passages 108 and 110 may each comprise a single opening of a different type than is shown in FIG. 1, or could each comprise a set of openings.

In use, once the water has risen to a designated level such as water level 12, the on-off switch 186 commences the operation of the pump 170 or other discharge means. The operation of the pump 170 causes a suction, drawing water from the interior of the filter element 124 and passing the water through the water transfer tubes 140 and 150 into the reservoir. The water now in the interior 134 of the reservoir 130 is discharged by the pump through the discharge or outlet tube 160.

A suction caused by removal of water from the interior 124 of the filter element 120 draws water from the first and second interior locations 104 and 105 through the first and second filter surfaces 121 and 122 into the interior of the filter element 124. The filtering material of the first and second filter surfaces 121 and 122 prevent suspended solid wast particles from entering into the filter interior 124 and thereby preventing the passage of solids to the pump where the solids would be eventually discharged to the drain field. The suction caused by the removal of water from the first and second interior locations 104 and 105 draws water from the clear zone 20 into the first and second interior locations 104 and 105 through inlet passages 108 and 110. For unfiltered waste water from the clear zone 20 to pass into the first interior location 104 the waste water must first pass through the first interior location inlet passage 108. For unfiltered waste water from the clear zone 20 to pass into the second interior location 105 the waste water must first pass through the second interior location inlet passage 110.

It is understood that water once having passed into the first interior location 104 can access the second filter surface 122 only after the water has passed through the first filter surface 121. Similarly, water in the second interior location may access the first filter surface 121 only after having passed through the second filter surface 122. The significance of this is that water having passed into the filter interior 124 will typically have somewhat of a turbulent flow caused by the passage of water into the interior 124 from the opposing filter surfaces 121 and 122. This somewhat turbulent flow will have a tendency to dislodge accumulated solids from the outer surfaces of both filter surfaces 121 and 122. This action is further benefitted by the open nature of the shield 102. Dislodged solid particles falling from the filter surfaces 121 and 122 will precipitate out of the shield by passing through the first and second interior location inlet passages 108 and 110 and out the open bottom of the shield. In this way the shield provides the dual benefit of minimizing the accumulation of solids on the filter surfaces and also self cleans itself by passing the solids out of the filter 100. Further significance of this arrangement is the two flow patterns that simultaneously exist in the filter thus maximizing efficiency of the filter 100. Additionally, should one flow pattern clog with solids, however unlikely, the other flow pattern will continue to function.

Once the water in the septic tank 200 has lowered to a predetermined level such as in indicated by water level 14, the on-off switch will shut down the pump until the level again has risen to the predetermined level. Discharging waste water incrementally in this way has shown to provide benefits to the efficiency of the drain field drainage and also provides a purging or cleansing effect to the piping used. Should the on-off switch fail to operate the rising water level in the tank will cause the water to eventually engage the high level alarm 188. If unfiltered waste water was allowed to enter the open top of the shield no damage would occur. For this reason there is no need to close the shield by providing the shield 102 with a top. Furthermore, should the on-off switch fail to shut off the pump once the water level drops the low level alarm and redundant off switch 184 will shut down the pump.

Although the waste water filter 100 of the present invention has been designed with features to minimize the need for maintenance, the filter can be easily user serviced. The waste water filter 100 of the present invention can be easily back flushed by sealing the top of the reservoir 130 and by then admitting pressurized clean water into the reservoir interior 134. The pressurized water will then pass through the water transfer tubes into the interior 124 of the filter and out the shield. The ease in which this back flushing technique may be performed allows the user to service the filter 100. An additional benefit of the waste water filter 100 of the present invention is the simplicity of its construction allowing for ease of manufacturing and ease of assembly. The waste water filter typically utilizes plastic components already in the marketplace.

It is understood that various modifications and changes in form or detail could readily be made without departing from the spirit of the invention. It is therefore intended that the invention be not limited to the exact form and detail herein shown and describe, nor to anything less than the whole of the invention herein disclosed and as hereinafter claimed.

I claim:

1. A waste water filter for use within a septic tank comprising:

a shield including a peripheral wall defining a shield interior within the shield, the shield further including a partially open bottom having at least one inlet location for allowing the entry of unfiltered waste water into the interior or the shield, the shield further including at least a first and second interior location, wherein unfiltered waste water entering into the shield will pass into the first and second interior locations;

a filter element disposed within the shield, the filter element including at least first and second filter surfaces, the filter surfaces including filtering means that allow the passage of water while restricting the passage of solids;

wherein the first interior location of the shield is in direct fluid communication with the first filter surface of the filter element, and the second interior location is in direct fluid communication with the second filter surface of the filter element;

wherein unfiltered waste water entering the first interior location can only access the second filter surface after having passed through the filtering means of the first filter surface and, wherein unfiltered waste water entering the second interior location can only access the first filter surface after having first passed through the filtering means of the second filter surface, an outlet in fluid communication with the filter element for discharging filtered waste water.

2. The waste water filter of claim 1, wherein the first filter surface of the filter element comprises a peripheral wall and the second filter surface comprises a second peripheral wall disposed within the first peripheral wall spaced at a distance therefrom, the filter element further including means to attach the first and second peripheral walls to thus enclose a region between the peripheral walls.

3. The waste water filter of claim 2, wherein the filter element is removable from the shield.

4. The waste water filter of claim 1, further comprising a reservoir in fluid communication with the filter element and the outlet, the reservoir being downstream of the filter element and upstream of the outlet.

5. The waste water filter of claim 4, further comprising means to transfer water from the filter to the reservoir.

6. The waste water filter of claim 5, wherein the means to transfer water from the filter to the reservoir is in detachable engagement to the filter.

7. The waste water filter of claim 4, further comprising a discharging means in fluid communication with the reservoir and the outlet.

8. The waste water filter of claim 7, wherein the discharging means is a pump.

9. The waste water filter of claim 1, comprising first and second inlet locations.

10. The waste water filter of claim 9, wherein the first and second inlet locations are disposed at two different vertical positions.

11. A waste water filter for use within a septic tank comprising:

a shield including a peripheral wall defining a shield interior within the shield, the shield further including a partially open bottom having at least one inlet location for allowing the entry of unfiltered waste water into the interior or the shield;

a filter element disposed within the shield, the filter element including a first peripheral wall and a second peripheral wall disposed within the first peripheral wall spaced at a distance therefrom, the first and second peripheral walls having inside and outside surfaces the inside surfaces of both peripheral walls facing each other while the outside surfaces of both walls face away from each other, the filter element further including means to attach the first and second peripheral walls to thus enclose a region between the peripheral walls, the first and second peripheral walls including filtering means for allowing the passage of relatively clear water while restricting the passage of solids, wherein the inlet locations of the shield maintain unfiltered waste water outside the first peripheral wall and also outside the second peripheral wall of the filter element;

and wherein relatively clear water having passed through the filtering means of the first and second peripheral walls is maintained in the region between the first and second peripheral walls of the filter element;

an outlet attached to the filter element in fluid communication with the region between the first and second peripheral walls for discharging filtered waste water.

12. The waste water filter of claim 11, wherein the filter element is removable from the shield.

13. The waste water filter of claim 11, further comprising a reservoir in fluid communication with the filter element and the outlet, the reservoir being downstream of the filter element and upstream of the outlet.

14. The waste water filter of claim 13, further comprising means to transfer water from the filter to the reservoir.

15. The waste water filter of claim 14, wherein the means to transfer water from the filter to the reservoir is in detachable engagement to the filter.

16. The waste water filter of claim 13, further comprising a discharging means in fluid communication with the reservoir and the outlet.

17. The waste water filter of claim 16, wherein the discharging means is a pump.

18. The waste water filter of claim 11, comprising first and second inlet locations.

19. The waste water filter of claim 18, wherein the first and second inlet locations are disposed at two different vertical positions.

* * * * *